United States Patent [19]

Kowalski

[11] Patent Number: 4,508,592
[45] Date of Patent: Apr. 2, 1985

[54] ELASTOMER EXTRUSION DRYING WITH GAS INJECTION

[75] Inventor: Ronald C. Kowalski, New Providence, N.J.

[73] Assignee: Exxon Research & Engineering Co., Florham Park, N.J.

[21] Appl. No.: 447,713

[22] Filed: Dec. 7, 1982

Related U.S. Application Data

[63] Continuation of Ser. No. 59,901, Jul. 23, 1979, abandoned, which is a continuation of Ser. No. 711,588, Aug. 4, 1976, abandoned.

[51] Int. Cl.³ .................... B01D 1/28; B01D 1/00
[52] U.S. Cl. ..................... 159/2.1; 159/DIG. 10; 528/500; 528/501
[58] Field of Search .......... 159/2 E, DIG. 10; 528/501, 502, 503, 499, 500

[56] References Cited

U.S. PATENT DOCUMENTS

| | | | |
|---|---|---|---|
| 2,949,447 | 8/1960 | Hawkins et al. | 159/2 E |
| 3,040,005 | 6/1962 | Burnhardt et al. | 159/2 E |
| 3,203,943 | 8/1965 | Houser et al. | 159/DIG. 10 |
| 3,222,797 | 12/1965 | Zies | 264/349 |
| 3,594,356 | 7/1971 | Hinton | 159/DIG. 10 |
| 3,683,511 | 8/1972 | Johnson et al. | 159/2 E |
| 3,799,234 | 3/1974 | Skidmore | 159/2 E |
| 3,847,022 | 11/1974 | McGinnis | 159/2 E |
| 3,917,507 | 11/1975 | Skidmore | 159/2 E |
| 3,963,558 | 6/1976 | Skidmore | 159/2 E |

Primary Examiner—Barry S. Richman
Assistant Examiner—John Donofrio
Attorney, Agent, or Firm—John J. Mahon; Harvey L. Cohen

[57] ABSTRACT

Extrusion drying of wet rubber crumb particles in the last phase of the overall elastomer drying process is improved through use of gas injected into the compression zone of an extruder thereby providing an improved efficiency in the explosion drying process. Rubber particles having a very low moisture content, such as less than 0.2% by weight, frequently less than 0.1%, are produced.

18 Claims, No Drawings

ELASTOMER EXTRUSION DRYING WITH GAS INJECTION

This is a continuation of application Ser. No. 059,901, filed July 23, 1979 now abandoned, which is a continuation of application Ser. No. 711,588, filed Aug. 4, 1976, now abandoned.

BACKGROUND OF THE INVENTION

This invention relates to a method for drying synthetic polymers, particularly elastomers, as the last stop of the overall finishing process subsequent to polymerization and prior to packaging. More particularly, the invention relates to improvement in the extruder explosion drying process for preparing finished polymeric particles having a very low content of volatile liquids such as solvents, diluents or water. It is especially suitable for preparing essentially dry rubbery polymers.

Various methods are known for drying or desolventizing polymers utilizing extruder apparatus and representative disclosures are found in British Pat. No. 1,037,125 (1966); U.S. Pat. No. 2,833,750 issued May 6, 1958 to Vickers; U.S. Pat. No. 3,683,511 issued Aug. 15, 1972 to Johnson et al; U.S. Pat. No. 3,222,797 issued Dec. 14, 1965 to Zies; British Pat. No. 965,183 (1964) and U.S. Pat. Nos. 3,834,440 and 3,874,090 issued, respectively, Sept. 10, 1974 and Apr. 1, 1975 to McCracken.

The aforesaid Johnson et al patent deals with the removal of volatile hydrocarbons from elastomers containing about 10 to 50% by weight of solvent using a vented extruder whereby inert gases or water are added to the extruder, mixed with the elastomer and vapors are flashed from the mixture by means of the vented section in the extruder. The elastomers are then discharged through the extruder die plate.

U.S. Pat. Nos. 3,874,440 and 3,874,090 describe an improved extrusion dryer having an adjustable variable flow restriction and a continuation bore and conveying means downstream of the restriction having an unrestricted outlet open to the ambient atmosphere.

Zies in both U.S. Pat. No. 3,222,797 and British Pat. No. 965,183 disclose a method for both preliminary dewatering and finish drying of a variety of polymers including elastomers in an extruder device. Zies contrasts his process with an isothermal extrusion technique as described by Vickers in U.S. Pat. No. 2,833,750. In Zies the process operates by transferring the polymer through the extruder so that both temperature and pressure are progressively increased and the polymer is brought to a maximum temperature just ahead of the discharge die plate. Maximum temperatures are maintained for only limited periods of time with Zies indicating, for example, that high temperatures of about 300° to 450° F. should not be exceeded for more than about 60 seconds. Zies also notes that it may be advantageous to pump a small amount of steam, inert gas or superheated steam into the apparatus in order to increase the porosity of the polymer issuing from the exit dies; however, the Zies process still requires the use of relatively high temperatures to provide the energy to dry the polymer.

In the production of synthetic elastomeric materials such as butyl rubber, chlorinated butyl rubber, brominated butyl rubber, EPDM elastomers and the like, the product obtained from the polymerization process is in the form of an aqueous slurry. To finish the product and prepare it for packaging, rubber particles which are essentially moisture free are conventionally prepared by a series of drying steps.

A typical drying process first employs a vibrating screen which accepts the initial slurry which contains only about 3 to 5 wt. % rubber, the balance being water. After this drying step, there is produced a rubber crumb containing 40 to 50% by weight water. Further drying is achieved at relatively low temperatures in a second step which comprises treating the material in a dewatering extruder which operates at a temperature range of about 180° to 220° F. This step provides rubber crumb particles containing from about 0.5% to 16% by weight water. Other preliminary drying steps comprise the use of extruders to expel water by squeezing as well as mills, tunnel dryers and the like or a combination of these preliminary methods and devices. Any combination of steps which produces a wet polymer containing up to about 16% by weight water, generally 0.5–16%, preferably 1–12% by weight water, may be used to provide the feed material for the practice of the present invention.

The most critical and final finishing step is extruder drying at more extreme conditions in order to provide an essentially moisture-free product. This extruder drying technique generally comprises an explosion or vented extrusion drying process at more elevated temperatures and pressures in order to produce rubber particles having a very low water content, such as less than about 0.5% by weight.

The present invention is an improvement in the explosion drying process carried out in an extruder and has as its essential feature the use of injected gas to facilitate the explosion of the rubber particles, whereby the drying is improved to an extent not heretofore possible using the conventional techniques. Both single and twin worm screw extruders are useful in the process of the present invention.

In such extruder explosion drying of wet rubber particles, the particles are forced through a worm screw extruder against a restriction zone at elevated pressure and temperature, and then allowed to explode through the restriction zone into a zone which is maintained at atmospheric pressure. Extrusion dryers employed in such processes are well known in the art and are generally described as comprising a feed zone wherein wet rubber particles containing about 0.5% to 16% by weight water are introduced, a high compression zone wherein the rubber particles are advanced along the barrel of the extruder by the mechanical force of the screw thereby increasing the temperature and pressure of the elastomer as it approaches the restriction zone, and finally, a restriction zone against which the pressure is applied, which can be either a fixed or variable orifice such as a variable die. The compressed material is then allowed to expand or to explode into a zone maintained at atmospheric pressure wherein the particles are collected, allowed to cool and conveyed to whatever packaging apparatus is employed.

In such conventional explosion drying techniques in an extruder, the reduction of water content to a very low level has frequently demanded the use of more extreme operating conditions of temperature and pressure. These conditions, particularly the high temperatures which result from increasing the pressure in the extruder device, can have undesirable effects on the level of quality of the product. Excessive temperatures may change the physical form and rheological charac-”

teristics of the rubber causing an incomplete explosion to occur, the product being too dense or low in viscosity at the point of explosion, as a result of which the explosion is incomplete or not uniform and moisture remains trapped in the crumb exiting from the unit. This requires recycling and reprocessing of incompletely dried particles. Also, high temperatures may cause degradation, scorching or ignition of the elastomer, alteration of the chemical structure of stabilizers and other additives or fouling of downstream equipment. Conventionally, these extruder explosion procedures employ water vapor as the explosion medium. A disadvantage in the conventional processing is the frequent inability to dry the material efficiently to a very low level of water content, such as substantially below about 0.3 wt. %.

In the present invention, it has been discovered that the injection of an inert gas into the extruder apparatus in the compression zone provides a more efficient explosion medium resulting in dry particles having a very low water or volatile liquid content not readily or consistently obtainable heretofore with a conventional extruder explosion drying method. In the present invention, the uniformly dried rubber crumb particles containing about less than 0.3% by weight water or volatile liquid and preferably less then about 0.2% by weight water, and frequently less than 0.1% such as about 0.02%, are readily obtained from feedstocks containing 0.5–16% by weight water or other volatile liquid. In addition, the usual extruder operating conditions of temperature and pressure are substantially reduced, a further advantage. Moreover, the novel drying process of the present invention is not altered or reduced in its effectiveness by substantial changes and variations of various feed parameters such as changes in the water content, pH drift, stabilizer and/or additive type and concentration, chemical and molecular structure of the elastomer and the like. In conventional prior art drying procedures these minor variations can have an adverse effect on the drying process but in the present invention no such effects are observed, thereby providing a substantial practical advantage in elastomer processing.

Minimizing the water content of finished rubber particles is a highly desirable objective of those in the industry. Water content levels of less than 0.3% and particularly less than 0.1%, such as about 0.02% by weight, are important for a variety of reasons. Water present in amounts in excess of these levels can cause numerous technical problems when the elastomer is compounded and cured. Also, from an economic and marketing point of view excessive water is economically disadvantageous in connection with the storage, packaging and transport of the finished product. For these combined reasons customer specifications in the elastomer industry frequently demand that water levels be substantially below 0.3%. The present invention is a significant advance in the art since it allows these specifications to be met in a process more efficient and effective than heretofore conventional processes which in many cases cannot produce dried rubber particles to meet the more demanding specifications.

The gas used in the present invention is preferably nitrogen or compressed air; the former being more preferred. Air is equally effective; however, its use may be limited by the possibility of polymer degradation reactions initiated by the presence of oxygen. Any gas which will remain in the gaseous state at pressures up to about 2000 psi and temperatures up to about 400° F. and further be nonreactive with the rubber polymer being treated will be a suitable explosion medium for use in the present invention, since what is required is a mixture of gas and elastomeric particles in the high compression zone of the extruder. Other suitable gases include argon, helium, neon $CO_2$ or mixtures thereof such as mixtures with nitrogen, but their use is less preferable for economic reasons.

The location of the gas injection sites is somewhat variable and has been found to be a function of the particular system being operated. The factors of significance which determine optimum location are pressure, viscosity, flow rate and screw design. Generally, the gas is injected at a site in the compression zone so that intimate mixing of the gas and polymer occurs before the polymer reaches the restriction zone. However, the gas injection site cannot be located at the initial portions of the compression zone since gas may escape or back up into the feed hopper. If desired, more than one injection site may be located along the compression zone such as 2, 3 or 4 injection sites in order to provide more thorough mixing of gas and polymer should that be desirable. One or more of these sites may be used as needed, suitable conventional flow control and pressure regulation means being provided to operate each injection site as required during processing. The compression zone of the extruder may generally be defined as that area within which the pressure is in excess of atmospheric pressure, the pressure remaining continually elevated due to the sealing effect along the extruder barrel created by the compressed polymer within the worm screw apparatus system.

The quantity of gas injected is partly a function of the flow rate through the extruder. For typical polymer processing rates of about 4 to 6,000 pounds per hour, the injection of about 20 pounds per hour of a gas such as nitrogen will generally give good results. Generally speaking, for processing rates of 4,000 to 11,000 pounds per hour, a range of about 10 to 100 pounds of nitrogen or, generally, 0.35 to 3.5 pound-moles of injected gas per hour is employed. Broadly speaking, the quantity of injected gas in order to cause efficient explosion drying can be expressed as about 0.004 to 0.04 pound-moles per hundred pounds of wet polymeric or elastomeric material being dried per unit of time.

The present invention allows the explosion drying process to be carried out in the extruder at more moderate temperatures and pressures then heretofore are employed, thereby providing a number of advantages. Conventional techniques generally exert pressures such that the maximum extruder temperature in a high compression zone is in the order of about 380° to 440° F. Such relatively high temperatures require additional time for post-treatment cooling steps before transferring the rubber particles to the usual baling packaging apparatus, baling usually being carried out at temperatures of about 150°–190° F. In the present invention through use of a gas injection technique, effective drying to a degree not heretofore possible in conventional extruder explosion drying is achieved at more moderate extruder operation temperature range of about 300° to 400° F. This results in a polymer which is substantially ready for packaging without further extensive cooling or post-treatment steps.

Such lower temperatures also result in a better quality elastomeric product, more uniformly dried crumb particles are present, lower energy requirements are needed for the extruder operation, and similar processing advantages. Superior particle size distribution has also been obtained, a further index of improved downstream processability and drying capability.

The cooling effect of the gas explosion drying in the present invention will generally produce rubber particles at relatively lower temperatures than heretofore possible. Because of this cooling effect a noteworthy further advantage in processing is obtained in that partial or complete elimination of downstream cooling procedures as a separate step is achieved. In conventional extruder drying, the material exiting from the extruder is substantially above the allowable baling temperature of 150°–190° F. such that cooling in an intermediate cooling device is a required step. This intermediate cooling adds time and expense to the overall elastomer finishing process as well as additional energy requirements. In the present invention, this step can be substantially reduced and even effectively eliminated since the particles are at a temperature more closely acceptable to the baling equipment. With many elastomers all that is required after explosion drying and prior to packaging is suitable means to disperse the gases and water vapor as the particles leave the extruder. Elimination of this cooling step provides substantial advantages and constitutes a further embodiment of the invention.

It has further been found that this cooling effect may be increased to ensure the production of relatively low temperature exiting polymer particles by utilizing water injection in conjunction with the gas injection technique of the present invention. Water may be conveniently added into the feed hopper of the extruder but it is also possible to inject the water under pressure into the extruder barrel itself. The explosion drying process of the present invention is so effective that it can tolerate additional quantities of added water for the purpose of temperature reduction and still produce dried particles below the desired level of about 0.3% by weight water.

Thus, at polymer processing rates of about 4,000 to 11,000 pounds per hour of elastomer particles, it has been found that the injection of about 100 to 200 liters of water per hour in conjunction with gas injection as described herein will provide dried elastomer particles meeting desired moisture specifications and provide the additional advantage of producing cooled, exploded particles within the baling temperature range of 150° to 190° F. Moreover, higher processing rates and reduced extruder power and temperature requirements are also observed due to the cooling effect of the added water. The use of water injection in conjunction with gas injection, therefore, constitutes a particularly preferred embodiment of the present invention.

This technique, that is, the simultaneous injection of water and gas, particularly nitrogen, is particularly useful in connection with the drying of butyl rubber. It has been found that product temperatures in the range of 160° to 170° F. are obtained with moisture contents of less than 0.2% weight when butyl rubber (isobutylene-isoprene) feedstocks initially containing 2–3 wt. % water are processed in accordance with the present invention.

The invention is especially applicable to a wide variety of synthetic rubber or elastomeric polymers which are processed by extruder drying. Principal among these are butyl rubber, halogenated butyl rubber, that is, chlorinated or brominated butyl rubber, particularly chlorinated butyl rubber, polyisobutylene, EPDM terpolymers, ethylene-propylene copolymers, and the like. Butyl rubber and halogenated butyl rubber feedstocks will usually contain about 2–9% by weight water while ethylene-propylene and EPDM elastomers generally have a feedstock water content of about 12–16% by weight.

Butyl rubber is a term well known in the art and refers to elastomeric copolymers of isoolefins and conjugated dienes which comprises 85 to 99.9% by weight of $C_4$–$C_7$ isoolefin, such as isobutylene, and 0.5 to 15% of combined $C_4$–$C_{14}$ conjugated multiolefin such as isoprene, piperylene, cyclopentadiene and the like. Generally, butyl rubber will have a molecular weight (Staudinger) of about 20,000 to about 500,000.

Halogenated butyl rubber, that is, chlorinated or brominated butyl rubber, is commercially available and is prepared by halogenating butyl rubber in a solution containing 1 to 60% by weight $C_5$–$C_8$ hydrocarbon solvent and forming a copolymer containing up to one halogen atom per double bond in the copolymer. Such halobutyl elastomers generally contain at least about 0.5%, preferably at least 1.0% by weight combined chlorine or bromine. Illustrative of chlorinated butyl rubbers useful in the present invention are chlorinated isobutylene-isoprene copolymers containing about 1.1 to 1.8 wt. % chlorine, 1 to 2 mole % unsaturation and having a viscosity average molecular weight of about 350,000 to 450,000. Typical brominated butyl rubbers will contain about 2.0% by weight bromine up to about 2.7% bromine. These brominated butyl rubbers are known to be difficult to dry effectively and, therefore, the present invention is particularly applicable to extruder drying of these elastomers.

EPDM terpolymers are defined in ASTM-D-1418-64 and refer to polymers containing ethylene and propylene in the backbone and a diene in the side chain. Preferred elastomeric EPDM terpolymers contain about 45 to about 80 wt. % ethylene and about 2 to about 10 wt. percent of a diene monomer, preferably a nonconjugated diene such as hexadiene, dicyclopentadiene, ethylidene norbornene, methylene norbornene, propylidene norbornene and methyl tetrahydroindene.

Other synthetic elastomers which may be processed in accordance with the present invention are ethylene-propylene copolymers, synthetic polyisoprene rubber, styrene-butadiene rubber, butadiene-acrylonitrile rubber, polybutadiene rubber, polyisobutylene, polychloroprene and similar elastomers.

While the invention is particularly useful for the drying of synthetic elastomeric polymers and has been developed to resolve problems related to that category of polymers, it is considered generally applicable to the drying or removal of volatile liquid from any polymer capable of being processed in an extruder where the removal of a volatile liquid such as a reaction and/or polymerization solvent, diluent or water is an essential part of the polymer finishing process. Examples of such other polymers are extrudable plastic, thermoplastic and thermoelastomeric polymers and copolymers as well as blends and mixtures thereof, such as polymers prepared by solution, suspension or emulsion polymerization as illustrated by polystyrene, poly(methyl methacrylate), polyvinylchloride, polyvinylidene chloride, rubber modified polystyrene, acrylonitrilebutadienestyrene polymers, ethylene-vinyl acetate copolymers, polyolefins such as polyethylene, polypropylene, polybutene, ethylene-butylene copolymers, polyurethanes such as elastomeric urethane polymers, polysulfide elastomers, silicone elastomers, polyesters, chlorinated polyethers, polycarbonates, polysulfones, polyamides, acetal resins, extrudable thermosetting resins, blends of polymers such as polyolefin-elastomer blends and the like.

The invention is further illustrated by the following examples which are not to be considered as limitative of its scope.

EXAMPLE 1

The elastomer used in this Example was "Exxon Chlorobutyl 1066" a chlorinated butyl rubber (isobutylene-isoprene copolymer) containing 1.1–1.3 wt. % chlorine, having 1.5 mole % unsaturation, a Mooney viscosity of 51–60 (ML-S@212° F.), and a viscosity average molecular weight of 350,000.

The extruder apparatus employed was manufactured in its original form by Welding Engineers, Inc., King of Prussia, Pa. Overall length of the extruder is about 10 feet. The device comprises twin screws each six inches diameter, counter-rotating and non-intermeshing, a feed hopper for introduction of wet rubber particles, a single nitrogen injection site located within the compression some 30 mm. from the fixed restriction zone which were full solid cylindrical bosses on the screw each four inches in length. Adjacent to the restriction is an expansion zone maintained at atmospheric pressure and an air conveying chamber for removing dried rubber particles and water vapor away from the expansion zone.

Chlorinated butyl rubber particles containing an average of 7.15% by weight water is received from a dewatering extruder and being at a temperature of 183° F. were introduced into the feed hopper of the extruder. The compression zone of the extruder operated at 400° F. Nitrogen was injected at a rate of 20 pounds per hour, the nitrogen inlet pressure varied between 750 and 1000 psi with nitrogen inlet temperature at 54° F. The processing rate was 5600 pounds per hour.

Explosive drying yielded uniformly dry rubber crumb particles having a water content of 0.02% by weight and a rubber crumb temperature of 246° F.

EXAMPLE 2

For comparison, Example 1 was repeated with the same conditions except no gas injection was used. An extruder compression zone temperature of 415° F. was required to process to wet elastomer at the same rate as Example 1. Particles produced were at a temperature of 280° F. and had a moisture content of 0.37% by weight.

EXAMPLE 3

Another experiment was carried out utilizing nitrogen injection, the elastomer and apparatus being the same as that employed in Example 1 at a processing rate of 6225 pounds per hour. Water content of the feed material introduced into the hopper was 4.53% by weight. Nitrogen gas was injected into the compressed elastomer at 750–1000 psi at the rate of 20 pounds per hour. Uniformly dried rubber particles containing 0.06% by weight water and having a temperature of 190° F. were obtained. 68 amps current was required to operate the extruder at these processing rates.

EXAMPLE 4

Example 3 was repeated at approximately the same processing rates with water injection, a conventional technique, being employed in place of gas injection; processing rate was 6000 pounds per hour and 0.22 gallons of water per minute was added to the feed material to provide additional explosion medium. Processing rate was 6000 pounds per hour with 80 amps current required to operate the extruder. The temperature of the product obtained was 212° F. with a product moisture content of 0.22% by weight. It was observed that the product contained significant amounts of "plates", that is, particles of unexploded rubber with trapped water which require reprocessing. A comparison of operating amperage and water content with the values repeated in Example 3 demonstrates the more efficient and effective explosion drying which takes place with gas injection.

EXAMPLE 5

In another modified twin screw extruder similar to that described in Example 1 except having a variable die restriction, wet butyl rubber (Exxon Butyl 268), an isobutylene-isoprene copolymer elastomer having a Mooney viscosity of 60 (ML 1+3 260° F.) and a viscosity average molecular weight of 450,000 containing 2.6% by weight water was processed with water injection in the manner of the prior art and with both nitrogen and water injection in the process of the present invention. In both cases water was introduced into the feed hopper. The comparative results are tabulated below:

|  | Water Injection | Water and Nitrogen Injection |
|---|---|---|
| Butyl Processing Rate, pounds per hour | 6292 | 6360 |
| Maximum Compression Zone Temperature | 428° F. | 303° F. |
| Rubber Crumb Product Temperature | 275° F. | 163° F. |
| $H_2$ injection rate, pounds per hour | 0 | 2.3 |
| Water injection rate, liters per hour | 105 | 85 |
| Amperage for Extruder | 82 | 56 |
| Product Moisture, wt. % | 0.14 | 0.15 |

This example illustrates the distinct advantages when nitrogen gas is used in conjunction with water injection. The gas injection technique of the present invention is so effective that water injection may be used to provide a desirable cooling effect as indicated by a rubber crumb product temperature of 163° F. as opposed to a product temperature of 275° F. when water injection alone is used. Also, there are substantial reductions in the maximum compression zone temperature in the extruder and the amperage required to operate the extruder. It should be noted that this category of elastomer, conventional butyl rubber, may be dried adequately by prior art extrusion techniques; however, the effectiveness of the gas injection technique of the present invention allows substantial advantages to be realized in operating conditions and processing rates. The throughput rate reported for the water injection comparative sum is the maximum that could be obtained; it was not possible to feed in rubber at any higher rate and still operate the extruder.

What is claimed is:

1. In the process for removing water from water-wet polymer particles by extruder explosion drying wherein said wet polymer particles containing about 0.5% to 16% by weight water are obtained from a polymerization process in the form of an aqueous slurry and are introduced and moved through said extruder so that both temperature and pressure are progressively increased in a high compression zone and said polymer is brought to a maximum temperature just ahead of a restriction zone against which said pressure is applied and through which said polymer is explosively discharged, the improvement comprising producing exploded polymer particles containing less than about 0.3 weight % water by:
(a) maintaining the polymer particles in said compression zone under sufficient pressure to increase the temperature thereof to about 300° to 400° F.; and
(b) injecting 0.004 to 0.04 pound-moles of an inert gas per 100 pounds of polymeric material at one or more injection sites located along said compression zone, said inert gas being injected at a pressure in excess of the pressure in said compression zone and being capable of remaining in the gaseous state at pressures up to about 2000 psi and temperatures up to about 450° F.

2. The method of claim 1 wherein the polymer is an elastomer.

3. The method of claim 2 wherein the gas is air.

4. The method of claim 2 wherein the dry elastomer particles have a water content less than about 0.1% by weight.

5. The method of claim 2 wherein the elastomer is butyl rubber.

6. The method of claim 2 wherein the elastomer is chlorinated butyl rubber.

7. The method of claim 2 wherein the elastomer is brominated butyl rubber.

8. The method of claim 2 wherein the elastomer is an EPDM.

9. The method of claim 2 wherein the elastomer is an ethylene-propylene copolymer.

10. The method of claim 2 wherein the elastomer is polyisobutylene.

11. The method of claim 2 wherein the exploded, dried particles are obtained at a temperature of 150° to 190° F. comprising the additional step of dispersing gases and water vapor from said particles and transferring said particles directly to a packaging apparatus in the absence of any cooling treatment step.

12. The method of claim 2 wherein the gas is nitrogen.

13. The method of claim 12 wherein 10 to 100 pounds of nitrogen are injected per hour into an extruder operating at the processing rate of 4,000 to 11,000 pounds per hour of wet elastomer particles.

14. The method of claim 13 wherein about 20 pounds of nitrogen per hour are injected.

15. In the process for removing water from water-wet polymer particles by extruder explosion drying wherein said wet polymer particles containing about 0.5% to 16% by weight water are obtained from a polymerization process in the form of an aqueous slurry and are introduced and moved through said extruder so that both temperature and pressure are progressively increased in a high compression zone and said polymer is brought to a maximum temperature just ahead of a restriction zone against which said pressure is applied and through which said polymer is explosively discharged, the improvement comprising producing exploded polymer particles containing less than about 0.3 weight % water by:
(a) maintaining the polymer particles in said compression zone under sufficient pressure to increase the temperature thereof to about 300° to 400° F.; and
(b) injecting 0.004 to 0.04 pound-moles of an inert gas per 100 pounds of polymeric material at one or more injection sites located along said compression zone, said inert gas being injected at a pressure in excess of the pressure in said compression zone and being capable of remaining in the gaseous state at pressures up to about 2000 psi and temperatures up to about 450° F.; and
(c) adding additional water to said extruder in an amount of about 100 to 200 liters for each 4,000 to 11,000 pounds of polymeric material.

16. The method of claim 15 wherein the elastomer is butyl rubber and dried particles having a temperature of 160° to 170° F. are produced.

17. The method of claim 15 wherein said additional water is added to the extruder along with said wet polymer particles.

18. The method of claim 15 wherein said additional water is added by injection under pressure into the extruder.

* * * * *